United States Patent [19]

Stern

[11] 4,168,420
[45] Sep. 18, 1979

[54] FILTERING APPARATUS FOR SEPARATING SOLID PARTICLES FROM GASES

[75] Inventor: Leif Stern, Lund, Sweden

[73] Assignee: Bill Peter Philip Nederman, Helsingborg, Sweden

[21] Appl. No.: 777,910

[22] Filed: Mar. 15, 1977

[30] Foreign Application Priority Data

Mar. 16, 1976 [SE] Sweden ................................. 7603312

[51] Int. Cl.² .............................................. B23K 9/00
[52] U.S. Cl. ............................................... 219/137.41
[58] Field of Search ............... 219/130, 131 R, 137.41

[56] References Cited

U.S. PATENT DOCUMENTS

| 2,373,598 | 4/1945 | Reeb | 219/130 |
| 3,024,353 | 3/1962 | Brashear, Sr. | 219/130 |
| 3,832,521 | 8/1974 | Niendorf | 219/131 R |
| 3,980,860 | 9/1976 | Howell et al. | 219/130 |

FOREIGN PATENT DOCUMENTS

488278 5/1970 Switzerland.
1351486 5/1974 United Kingdom.

OTHER PUBLICATIONS

*Hobart Smoke Exhaust System*, NWSA 563-E, May, 1972, published by Hobart.

*Primary Examiner*—Bruce A. Reynolds
*Assistant Examiner*—Clifford C. Shaw
*Attorney, Agent, or Firm*—Schwartz, Jeffery, Schwaab, Mack, Blumenthal & Koch

[57] ABSTRACT

A filtering apparatus for separating solid particles from gases includes an inlet end-wall member, an outlet end-wall member, and a filter unit disposed therebetween. A filter element is disposed within the filter unit in surrounding relationship with a power unit for moving gas through the filter element. The filter unit includes a filter enclosure extending between the end-wall members and releasably connected therewith. The filter enclosure has open ends and sides defined by an inner wall and an outer wall, the inner and outer walls together defining a filter compartment for the filter element. The inner wall also defines an interior compartment for the power means and the outer wall forms a casing detachably connected to the end wall members. The filter compartment communicates through one of its open ends with the inlet end wall member and communicates through the other of its open ends and through the interior compartment with the outlet end wall member.

3 Claims, 3 Drawing Figures

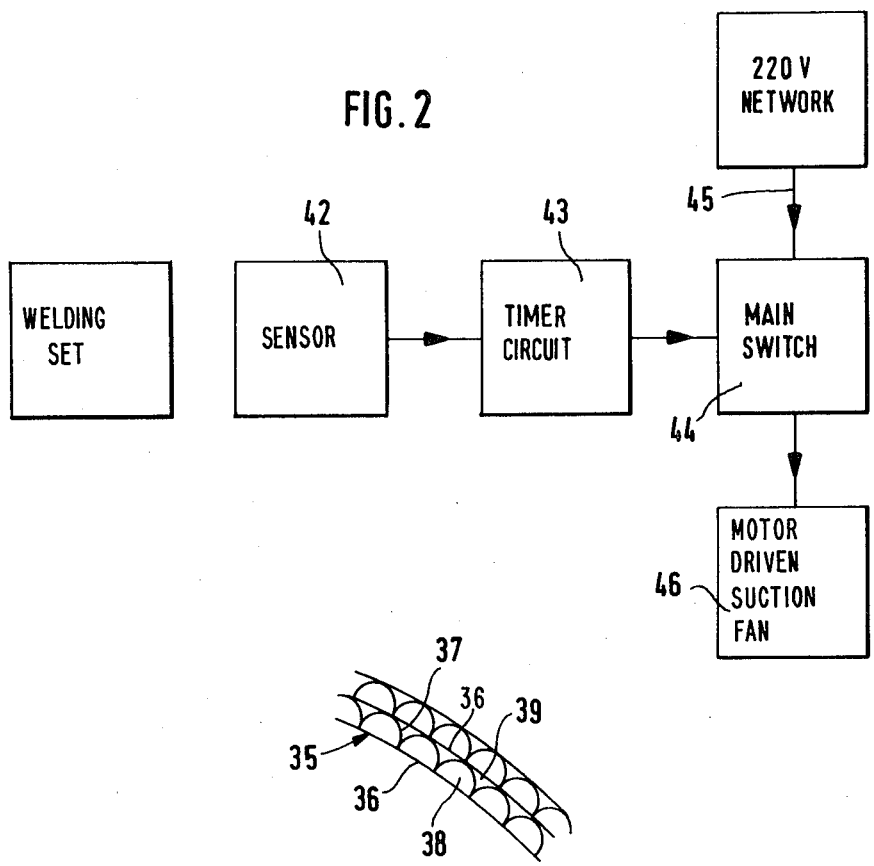

FILTERING APPARATUS FOR SEPARATING SOLID PARTICLES FROM GASES

The present invention relates to apparatus for separating solid particles from gases, preferably welding gases, the apparatus comprising, on one hand, at least one filter unit including at least one filter element and, on the other hand, at least one power unit, preferably a suction fan, adapted to draw a gas-flow through the filter element of the filter unit.

In the use of apparatus of the type indicated above, it is usually desired, on one hand, to separate sparks and heavier particles to prevent their penetration into the filter unit and causing ignition thereof, and on the other hand, to enable the use of filter elements which can be heavily loaded and also offer a large filter area, and, thirdly, to enble the employment of a high-capacity power unit, and fourthly, to enable the power unit to be disposed in a manner to muffle its noise substantially.

Although prior-art devices, to a certain extent, have been devised to fulfil the functions aimed at, it has been found that the apparatuses tend to be more complicated and costly, larger more unwieldy and more difficult to assemble and disassemble, the more extensively equipped they are in order to fulfil the functions aimed at.

The present invention has for its object to provide an apparatus for separating solid particles from gases, which apparatus efficiently fulfils various desired functions while utilizing a small number of simple parts, which is strong, easy to assemble and disassemble and which provides a portable unit available at low cost. The present invention achieves this object by providing a filter unit disposed between a pair of end-wall units as a separate, doublewalled filter container having an inner wall separating at least one interior compartment for the power unit from at least one filter compartment disposed inside an outer wall and containing the filter element, and open end sides at both sides thereof, the filter compartment communicating through one of its open ends with one end-wall unit designed as a gas-inlet unit and communicating through its other open end with the opposite end-wall unit designed as a gas-outlet unit.

As a consequence of these features there will be defined, by a small number of elements a space or compartment for receiving the power unit whereby the filter unit, in addition to its characteristic filtering properties, has sound-insulating properties to muffle the noise from the fan and whereby the filter unit can be conveniently disassembled and reassembled for replacing a contaminated filter unit by a fresh one. Furthermore, the filter unit and the end-wall units impart to the apparatus a compact from without making the apparatus too heavy to be carried about.

The invention will now be described more in detail with reference to the accompanying drawings, in which:

FIG. 2 is a block-diagrammatic view of the electrical circuit including the suction-fan motor of the apparatus; and FIG. 3 illustrates a portion of a filter forming part of the apparatus.

Figure 1:
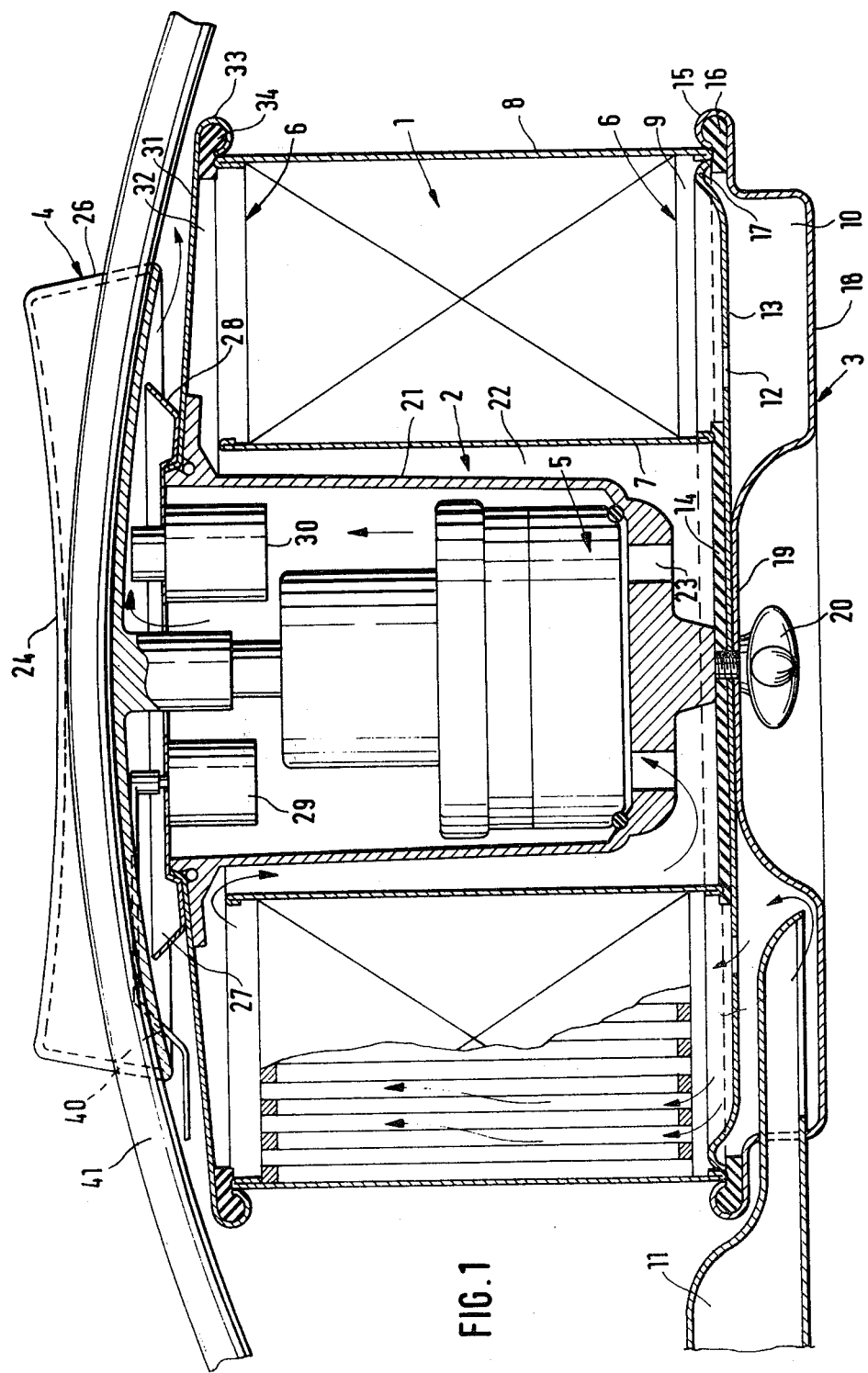
FIG. 1 illustrates the apparatus according to the invention with its main components shown in cross-sectional view.

The apparatus illustrated in the drawings is adapted for use in separating solid particles from gases, preferably welding gases, and comprises, on one hand, at least one filter unit 1 including at least one filter element 6, and, on the other hand, at least one power unit 5, which preferably is an electrically driven suction fan adapted to draw gas through the filter element 6 of filter unit 1.

In order, to ensure efficient spark arresting and noise reduction in this arrangement, a durable filter having highly efficient filtering properties, as well as convenience in assembly and disassembly of a small number of light-weight and dismountable parts. According to the present invention, the power unit 5 is disposed within an interior space or compartment 2 defined, on one hand, by the filter unit 1, and, on the other hand, by two end-wall members or units 3 and 4 of which one end-wall unit 3 constitutes a gas-inlet unit through which a flow of gas enters the filter unit 1 to be conducted therein so as to pass through said filter element 6, whereas the other end-wall unit 4 constitutes a gas-outlet unit through which gas leaves the apparatus.

In order to construct the filter unit 1 as a sturdy and easily interchangeable unit adapted to withstand internal and external pressure loadings, it is comprised of a separate enclosure having at least one space or compartment filter 9 defined between an inner wall or barrel 7 and an outer wall or barrel 8 and within which the filter element 6 is disposed.

To the end of making this filter unit an interchangeable unit defining the peripheral outer and inner walls of the apparatus and to which the end-wall units 3 and 4 are directly connectable and after connection will have their interior spaces communicating with the interior of the filter unit 1, the arrangement is so devised that the inner barrel 7 constitutes one wall of the space 2 containing the power unit 5, that the outer barrel 8 constitutes an outer wall of the apparatus extending between the end-wall units 3 and 4, and that the end sides of the space 9 defined by the barrels 7, 8 forming the enclosure for the filter element 6 are open.

The end-wall unit 3 forming the gas-inlet unit may include an annular passage 10 into which at least one suction conduit 11 opens, this suction conduit 11 preferably being connected to the end-wall unit 3 by a quick-coupling and adapted to direct the gas-flow in a manner to cause the latter when flowing through the passage 10 in one direction to rotate so as to create a cyclone effect.

In order to provide simple means for effectively preventing spark transfer to the filter unit 1, the annular passage 10 extends beneath the space 9 containing the filter element 6 of the filter unit 1 and is separated from this space 9 by a partition 13 which is provided with through-flow apertures 12 and which is preferably made as a separate unit.

In order, in a simple way, to ensure sealing between the end-wall unit 3 and filter unit 1, at least one sealing element 14 of a sealing material, preferably rubber, may be superposed on the partition member 13, the barrel 7 of the filter unit 1 forming a wall of the space 2 sealingly engaging said sealing element 14 to provide a sealed-off communication passageway between the inner barrel 7 of the filter unit 1 defining the space 2 and the end-wall unit 3 constituting the inlet-unit of the apparatus.

To the end of enabling quick assembly of the filter unit 1 and end-wall unit 3 while ensuring efficient sealing action, the end-wall unit 3 constituting the inlet unit includes an outer peripheral edge portion or rim 15 adapted, on one hand, to form a catch or socket for holding a sealing element 16 of a sealing material sealingly engaged by the outer barrel 8 of the filter unit 1, and, on the other hand, to form a guiding edge for the outer barrel 8.

The guiding of the outer barrel 8 of the filter unit in connection with assembly of the filter unit 1 and end-wall unit 3 can be further improved by forming the partition member 13 with an outer peripheral edge portion or rim 17 engaging the sealing element 16 and defining with the guiding edge of the edge portion 15 an annular recess of clearance into which an edge of the outer wall 8 projects.

In the embodiment illustrated, a thin-walled but very rigid end-wall of the apparatus is provided owing to the fact that a wall-element 18 forming part of the end-wall unit 3 constituting the inlet section, on one hand, defines the annular passage 10 and, on the other hand, forms the edge portion 15 outside this passage 10, and, further, inside the passage 10 provides an inner wall portion 19 which directly or indirectly defines the space 2.

The power unit 5 may be mounted on both end-wall units 3 and 4, the power unit 5 being connected to the inlet end-wall unit 3 by at least one clamp screw 20, which can be unscrewed to enable the filter unit 1 to be disconnected from the outlet end-wall 4 and the power unit 5, as well as from the inlet end-wall 3.

In order, for the purpose of cooling and noise-muffling, to cause the cleaned air to sweep the entire power unit, the latter has a casing 21 defining with the filter unit 1 a through-flow space 22 extending along the major portion of filter unit 1 and communicating at one end thereof with the space 9 which contains the filter element 6 of filter unit 1, and at the opposite end thereof with the power unit 5 through at least one inlet opening 23 in the casing 21.

To enable the apparatus according to the invention to be used in operation as a warming stool, the outlet end-wall unit 4 comprises a seat 24, and it will be apparent that this seat is for a human operator, i.e., a welder, to sit on. Beneath seat 24 is a a space 25 which receives heated gas flowing upwardly from the power unit 5, the space 25 being open beneath the outer periphery 26 of the seat 24.

The end-wall unit 4 may have associated therewith a carrier 27 for the power unit 5, this carrier 27 being formed with a protective collar 28 adapted to prevent any water or other fluids or objects penetrating in beneath the seat 24 from proceeding further to enter outlet openings and pass therethrough down to the power unit 5. The carrier 27 may suitably form an attachment for at least one control 29 for manually controlling the power unit 5, and/or an attachment for an operating switch 30 for automatically switching the power unit 5 in and out.

In order to retain the filter unit 1 in a fixed position within the apparatus without necessitating any use of parts which would create a high level of air resistance, the end-wall unit 4 includes an end-wall or terminal wall 31 spaced from the filter element 6 of filter unit 1 by at least one spacer element 32, preferably in the form of a grid, which is adapted to prevent any displacement of the filter element 6 in the gas-flow direction but which allows gas-flow from the space 9 of the filter unit 1 to the space 2 containing the power unit 5. The end-wall 31 preferably has an outer peripheral edge portion or rim 33 which, on one hand, forms a catch for retaining a sealing element 34 of a sealing material sealingly engaged by the outer barrel 8 of the filter unit 1, and, which on the other hand, forms a guiding edge for the outer barrel 8.

To enable access to the power unit by separating one end-wall unit 4 from the filter unit 1, the apparatus is so designed that the power unit 5 and/or an outer casing 21 (if any) enclosing the power unit 5 is detachably associated with the outlet end-wall unit 4.

To provide a filter element having fan-noise muffling properties, high particle separation capacity and high stability, the filter element 6 comprises superposed outer filter-material layers 36, 37 (FIG. 3) defining with each other elongated passageways 38, 39, the juxtaposed layers extending helically about the inner barrel 7 in a manner to enable gas coming from the inlet end-wall unit 3 to flow through the passageways 38, 39 towards the outlet end-wall unit 4 and leave the filter element 6 after having passed through the filter layers.

The filter element 6 will have particularly long service life, high particle separating capacity and, in addition, high durability against both internal and external pressure loading, if at least one of the fibrous-material layers 37 divides a space between filter-material layers 36 disposed at both sides thereof into inflow passageways 38 having substantially larger cross-sectional areas than those of the outflow passageways 39, so as to form at least one inflow-passageway system having essentially larger through-flow area than that of the outflow-passageway system, whereby solid particles separated from the gas can be stored within the inflow-passageway system without the through-flow area of the latter getting smaller than that of the outflow-passageway system.

In order to utilize the space between the fibrous material layers in a particularly effective way as regards particle collection, and also to establish a durable filter pack, the intervening fibrous-material layer 37 is designed to define inflow passageways 38 of a cross-sectional shape essentially different from that of the outflow passageways 39.

To form the intervening fibrous-material layer 37 to provide a large number of juxtaposed stiffening portions, said layer 37 is so shaped as to form corners or apices engaging one adjacent fibrous-material layer 36, and arcuate portions extending between each couple of adjacent apices and engaging the other adjacent fibrous-material layer 36, each arcuate portion interconnecting two apices to define with said first-mentioned adjacent fibrous-material layer an inflow passageway 38.

From the points of view of stability and particle collection, particularly good results will be obtained if the inflow passageways 38 have a substantially triangular cross-sectional shape, although in certain cases, alternatively, a substantially square cross-sectional shape of the inflow passageway 38 may be suitable.

In order, on one hand, to enable effective fixation of the intervening fibrous-material layer 37 to one of the other fibrous-material layers 36, for instance with a binder, and, in addition, to define efficient particle-collecting pockets, the intervening filter-material layer 37 may include connecting portions engaging connecting portions of the adjacent filter-material layer so as to cause the connecting portions of the respective layers to form with each other an angle of 45° to 90°, preferably 50° to 70°.

A stable and effective filter pack will be provided in a particularly simple and cost-saving manner, if the layers 36, 37 are rigidly interconnected by means of adhesive strips which close off the outflow passageways 39 at one side of the filter element and the inflow passageways 38 at the opposite side of the filter element.

The filter element 6 may be so devised that the passageways 38, 39 therein extend along the major portion, at least, of the space 2 containing the power unit 5. Further, two filter units 1, at least, may be associated with each other in such a way that air coming from the inlet end-wall unit 3 will first flow through one of the filter units and then through the other one and from the latter into the space 2 containing the power unit 5. It may be advantageous in certain cases to use different filter units containing filters with different filtering properties, for instance different filtering powers.

The service life of the power unit 5 and filter element 6 can substantially increased if the end-wall unit 4 is provided with a socket 40 for holding a welding cable 41 and at least one switch 30 for switching the power unit 5 on and off, the switch being actuated to switch the power unit 5 on and off in response to changes in strength of the magnetic field induced about the welding cable. As will be immediately apparent from FIG. 1, the portion of welding cable 41 shown in FIG. 1 is a continuous and uninterrupted cable portion. The switch 30 may include a sensor 42 (FIG. 2) in the form of a conventional pick up which senses changes in the magnetic fields of the welding cable 41 and actuates a conventional timer circuit 43 which, in its turn, actuates a switch 44 adapted to close or break a circuit 45 containing the drive motor 46 of the power unit 5. It is thus immediately apparent that the operation of the filter unit is automatically controlled in response to the welding set without a need for direct electrical connection between the welding set and filter unit.

Socket 40 may suitably be in the form of a recess which is formed in a seat 24 forming part of the outlet end-wall unit 4. The recess or socket 40 may extend across the seat 24 and decline from the centre of seat 24 towards its edges, thereby protecting the cable from acute bends. As is readily apparent from FIG. 1, the recess or socket 40 holds a length of welding cable 41 in close juxtaposition to the switch 30, which, as indicated, may include a sensor 40. It will also be apparent from FIG. 1 that the cable is held in a position offset to one side only of the switch 30 (which may include the sensor), i.e., neither the sensor nor the switch surround the cable.

The arrangement described by way of example is intended to illustrate the invention in a non-limiting sense. Features described and illustrated can be varied as required without departing from the scope of the invention. Thus, the apparatus may be provided with various accessories, such as handles, for facilitating transport and assembly.

I claim:

1. In a combined electrical welding set apparatus and filter unit, the welding set having a welding cable with a continuous and uninterrupted portion, the filter unit having a power unit for effecting flow of gas through the filter unit, the improvement comprising:
    (a) means coupled with said filter unit and connected with said power unit, for switching said power unit on and off;
    (b) said switching means including means for sensing changes in the magnetic field of a length of said continuous and uninterrupted portion of the welding cable; and
    (c) means coupled with said filter unit for holding said length of said continuous and uninterrupted portion of the welding cable in close juxtaposition to said sensing means and offset to one side only of said sensing means;
    (d) whereby changes in the magnetic field around the welding cable actuate said sensing means to, in turn, actuate said switching means to automatically control the operation of the filter unit in response to the operation of the welding set without a need for modifying or interrupting the welding cable, the welding set, or the filter unit.

2. The combination as defined in claim 1, wherein said filter unit includes a seat on which a human operator may sit, said cable holding means including a recess in said seat.

3. The combination as defined in claim 2 wherein said seat has edges and said recess extends across said seat and declines from the center of the seat toward its edges to protect the welding cable from acute bends.

* * * * *